United States Patent [19]

Winstead

[11] 4,420,291

[45] Dec. 13, 1983

[54] DYNAMIC COOLER APPARATUS FOR MOLTEN THERMOPLASTIC MATERIAL

[75] Inventor: Thomas W. Winstead, Baltimore, Md.

[73] Assignee: Maryland Cup Corporation, Owings Mills, Md.

[21] Appl. No.: 1,178

[22] Filed: Jan. 5, 1979

[51] Int. Cl.³ .................. F04B 17/00; F04B 35/04; F04C 2/16; F04C 15/00
[52] U.S. Cl. .................. 417/338; 417/410; 418/83; 418/91; 418/94; 418/102; 418/202
[58] Field of Search ............ 418/83, 91, 94, 102, 418/202, 205, 206; 417/338, 374, 410

[56] References Cited

U.S. PATENT DOCUMENTS

| | | | |
|---|---|---|---|
| 1,189,766 | 7/1916 | Wilkin | 417/338 |
| 2,136,117 | 11/1938 | Nichols | 418/94 |
| 2,410,172 | 10/1946 | Lysholm | 418/202 |
| 2,515,201 | 7/1950 | Dulmage et al. | 418/201 |
| 2,640,428 | 6/1953 | Houghton | 417/410 |
| 3,007,460 | 11/1961 | Bentele et al. | 418/83 |
| 3,113,525 | 12/1963 | Mello | 418/102 |
| 3,649,147 | 3/1972 | Fritsch | 425/170 |
| 3,830,901 | 8/1974 | Winstead | 264/51 |
| 4,032,391 | 6/1977 | Moked et al. | 418/206 |
| 4,073,607 | 2/1978 | Webb et al. | 418/94 |
| 4,137,023 | 1/1979 | Moked et al. | 418/202 |

FOREIGN PATENT DOCUMENTS

638364 6/1950 United Kingdom .
785860 11/1957 United Kingdom .

Primary Examiner—John J. Vrablik
Attorney, Agent, or Firm—Birch, Stewart, Kolasch & Birch

[57] ABSTRACT

A dynamic cooler apparatus is provided for dynamically cooling molten plastic extrudate while pumping metered amounts of that extrudate to an extrusion die or the like. The dynamic cooler apparatus utilizes bi-helical gears in a gear pump configuration in a housing in which a heat exchange medium is circulated. The heat exchange medium is also circulated internally of the gears so that the gear teeth and the housing act to cool discrete volumes of extrudate from four sides defined by the gear teeth and the internal surface of the housing. The bi-helical gears are driven to minimize loading between the teeth thereof and to permit the teeth to be as small as practical to present more cooling surface for a given cross-section of extrudate and optimize the heat transfer capability of the dynamic cooler apparatus. Provision is also made to use the molten extrudate as a lubricant for the shafts and bearings of the bi-helical gears.

22 Claims, 17 Drawing Figures

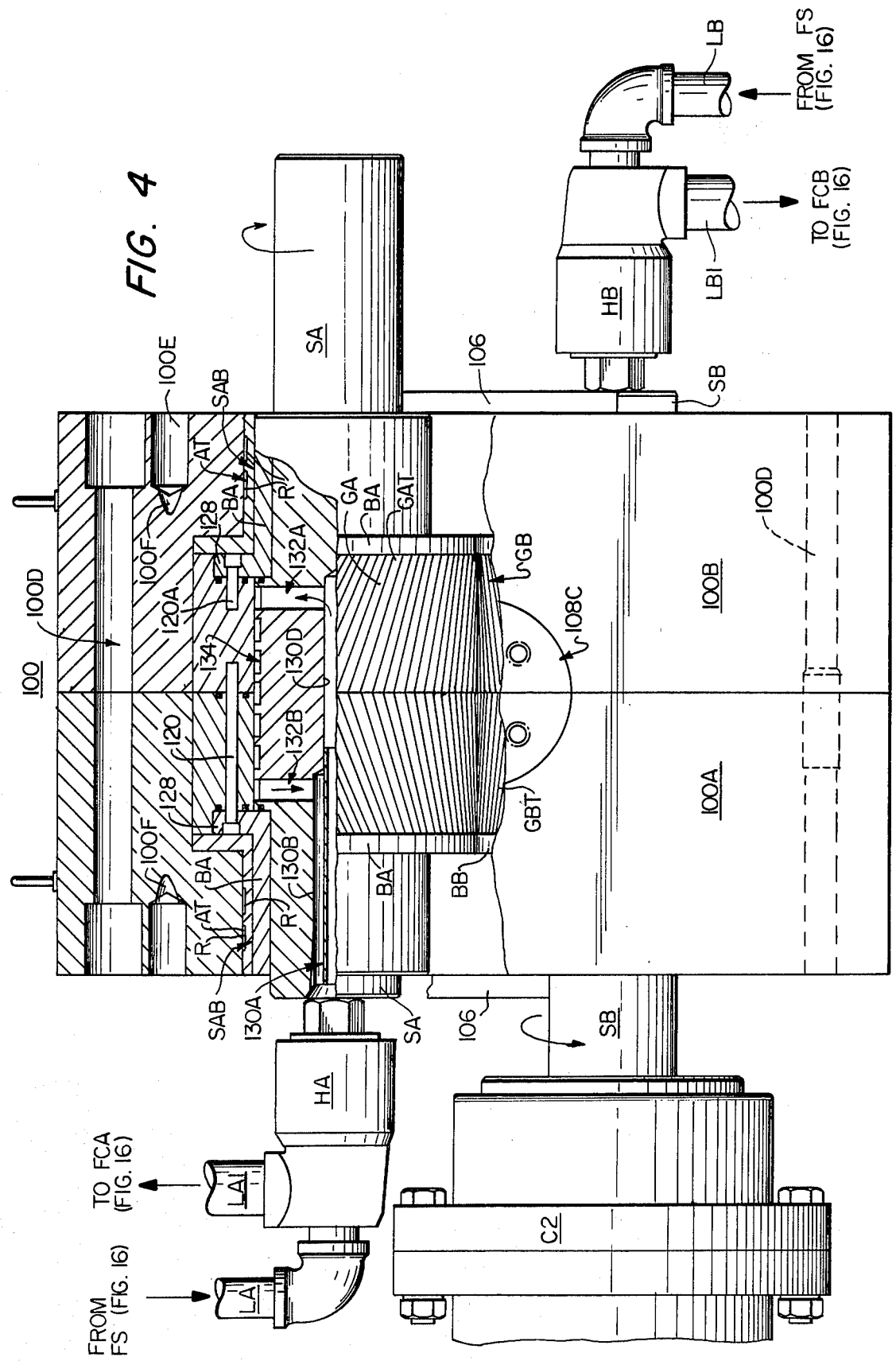

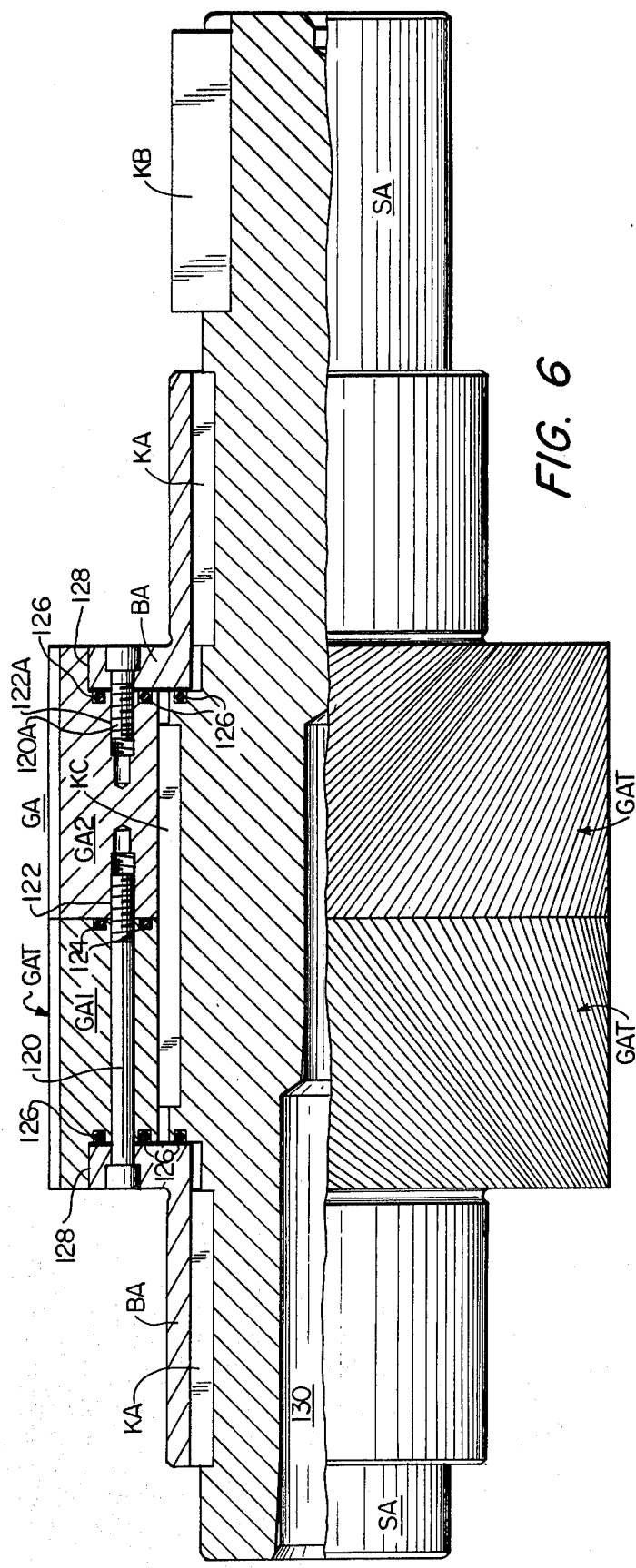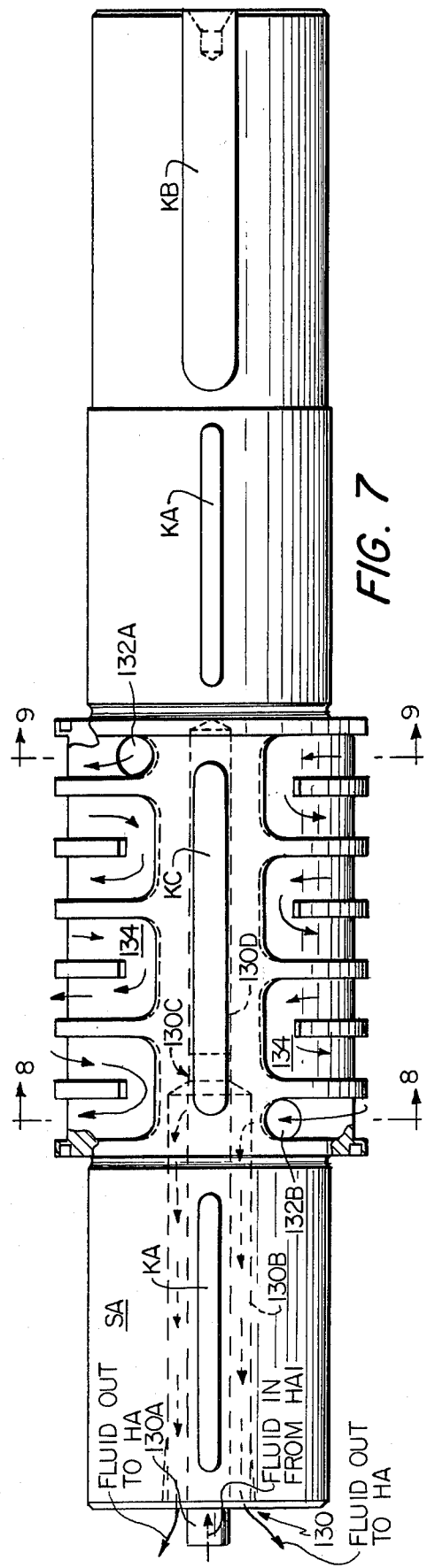

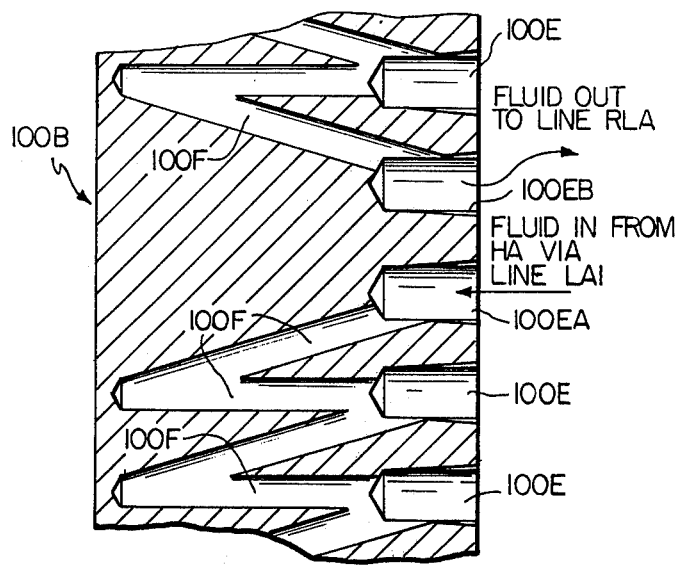
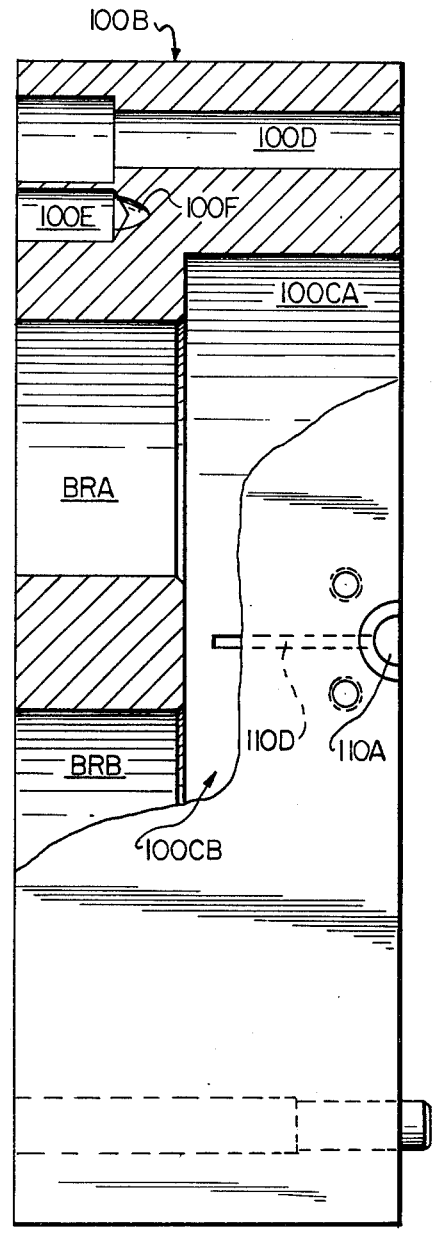
FIG. 13
FIG. 14

DYNAMIC COOLER APPARATUS FOR MOLTEN THERMOPLASTIC MATERIAL

FIELD OF THE INVENTION

This invention relates to dynamic cooler means and more particularly, to a means for simultaneously metering the flow and controlling the temperature of molten thermoplastic material upstream of a die orifice in an extruder line.

BACKGROUND OF THE INVENTION

In the extrusion of cellular thermoplastic such as foamed polystyrene and the like, it has been established in the art that in order to obtain satisfactory product from the extrusion line, it is most desirable to accurately control the temperature and flow rate upstream of the extrusion die.

In single screw extruder systems this is quite difficult to accomplish since changing one variable such as temperature will affect the pressure and vice versa. Therefore, as illustrated in U.S. Pat. No. 3,830,901 of Thomas W. Winstead issued Aug. 20, 1974 and entitled "Continuous Process for Extruding Cellular Thermoplastics," a process was developed for achieving desirable foam product from a continuous process utilizing a single screw extruder and a separate cooled metering pump both thermally and physically separated from the extruder but upstream from the extrusion die.

The disclosure and teachings of this patent are incorporated by reference herein.

In providing a metering pump and heat exchange device, which shall hereinafter be referred to as a dynamic cooler apparatus, it has been recognized that because of the high pressures involved and the high viscosities of the plastics used at the temperature levels required for satisfactory foam products to be extruded, there were no suitable commercial devices available for or which could be adapted to this particular application. Accordingly, the need was established for a strong, accurate and efficient dynamic cooler apparatus for use in continuous extrusion processes.

One prior art alternative to dynamic cooler type control is a tandem extrusion system which, however, is not nearly as efficient as dynamic cooler type systems. For example, tandem extrusion systems might produce five pounds per hour per horse power while a dynamic cooler type system can produce at least 15 pounds per hour per horse power. This clearly illustrates the disparity in the efficiencies between dynamic cooler systems using the apparatus of the present invention and those conventional systems known in the art. The inefficiency of these conventional systems is due partly to poor heat transfer, because of thick cross-sections in the extrudate, and partly because of the conveying or pumping inefficiency present in the screw extruders utilized. A typical tandem extrusion system, for example, might utilize a six inch extruder for cooling. Within the flights of the screw conveyor within that extruder, plastic mass is approximately three-quarters of an inch to one inch thick in cross-section and is cooled mostly from the barrel of the extruder by conduction. Since the rate of heat transfer from the plastic is inversely proportional to the thickness of the cross-sections thereof and since a typical plastics extrusion screw requires certain orders of magnitude of the cross-section of the plastic mass which does not lend itself to truly efficient cooling and temperature control; and further, since a typical plastics extrusion screw is not a positive displacement device it is inefficient as a conveyor or pump, it creates a great deal of additional heat in the plastic mass in the process of conveying it along the length of the screw.

Therefore, some form of metering and cooling apparatus is needed which will give both an efficient and controllable thermal transfer for the purposes of cooling the plastic mass as well as accurately and positively displacing that mass from the upstream side of the extrusion die into the extrusion die to thereby provide the desired uniformity of product.

It is therefore an object of the present invention to provide a new and novel dynamic cooler apparatus for efficiently and continuously and uniformly cooling and metering thermoplastic material previously fluxed and mixed with a suitable blowing agent to an extrusion die.

Still another object of the present invention is to provide a new and novel dynamic cooler structure including a positive displacement gear pump in which the gear teeth have minimum loading imparted thereto while operating at relatively high material pumping pressures and flow rates.

Still another object of the present invention is to provide a new and novel dynamic cooler structure for cooling and metering fluxed and blowing agent mixed thermoplastic material from a screw extruder to an extruding die, which dynamic cooler apparatus achieves the division of the molten plastic into optimally minimum cross-sections and provides a new and novel means for cooling these sections on all four sides thereof.

Yet another object of the present invention is to provide a new and novel dynamic cooler structure including new and novel gear pump means having separate drive means for each gear therein to preclude excessive gear tooth loading.

Yet another object of the present invention is to provide a new and novel dynamic cooler apparatus including a gear-type metering pump in which the shafts are lubricated by the molten plastic being cooled and metered by the apparatus.

These and other objects of the present invention will become more fully apparent with reference to the following specification and drawings which relate to a preferred embodiment of the present invention.

SUMMARY OF THE INVENTION

The dynamic cooler apparatus of the present invention includes a metering pump disposed within a relatively massive heat exchange jacket with the gear teeth of the metering pump being configured as bi-helical gears which in a 300 pound per hour metering pump would provide typical cross-sections in the molten plastic mass transmitted by the gears of approximately one-eighth of an inch square. The combinations of the bi-helical gears and individual direct current motor drive means for each gear coordinated such that a balancing circuit precludes excessive gear tooth loading by virtue of one gear driving another, provides an efficient and accurate metering means for the dynamic cooler apparatus. The use of these bi-helical gears prevents entrapment of plastic at the root of the gear tooth in each gear while obviating the requirement of relief at the ends of each tooth in order to avoid excessive pressure buildup as in conventional straight-toothed gear pumps. The gears are of substantially identical diameter and are internally cooled concurrently with controlled cooling of the housing such that all four sides of the plastic mass are subjected to heat exchange through the housing, the gear bodies and the gear teeth.

The housing embodies two relatively massive housing halves which are bolted together and which each contain one-half of a figure eight shaped cavity adapted to receive the metering gear teeth in the gear pump configuration.

Pressures are on the order of 10,000 pounds per square inch and accordingly, the housing is massive for the purpose of both uniformity of heat exchange as well as strength. Housing heating and cooling is provided by circulating heat transfer liquid through continuous serpentine cooling channels provided in each half of the housing and through internal cooling channels in the gears and gear shafts. The housing may be heated electrically and cooled with heat transfer fluids rather than heated and cooled by heat transfer fluids alone.

Flanged sleeve bearings are utilized to maintain the gear shafts and the metering gears in a proper relationship within the housing and these bearings are both thermally isolated from the balance of the housing and provided with sufficient clearance to permit controlled leakage of molten plastic into the spaces between the gear shafts and the housing to provide for bearing and lubrication action by the molten plastic which will seep into that space.

Each gear shaft is separately driven by a direct current motor linked one with the other through a balancing circuit to assure equal load sharing between the two motors and avoid appreciable loading of the gear teeth to thereby permit the gear teeth to be of optimally small size, thereby preventing unduly large cross-sectional area in the molten plastic mass as it proceeds through the dynamic cooler apparatus by virtue of the channels between the gear teeth. The less loading on the gear teeth of the two metering gears, the smaller these teeth can be and consequently, the smaller the cross-sectional diameter of the plastic mass being metered and cooled. This optimizes the heat transfer capability of the dynamic cooler apparatus and provides for the degree of control necessary to produce quality extruded foam product. A preferred cross-sectional diameter of plastic mass between the gear teeth and the housing is on the order of $\frac{1}{8}''$ for molten polystyrene.

BRIEF DESCRIPTION OF THE DRAWINGS

FIG. 4 is an enlarged partial cross-section inlet side view of the metering pump and housing of the dynamic cooler apparatus of the present invention;

FIG. 6 is a side elevation in partial cross-section illustrating an assembled pump gear and pump gear shaft of the present invention;

FIG. 7 is an enlarged side elevation of a metering gear shaft of the present invention illustrating some of the coolant circulating channels therein;

FIG. 13 is a detailed cross-section taken along line 13—13 of FIG. 12 illustrating the serpentine continuous path of the cooling channels in the housing half illustrated in FIGS. 10, 11 and 12;

FIG. 14 is an end view in partial cross-section of the housing half of FIGS. 10-12;

DETAILED DESCRIPTION OF THE DRAWINGS

Figure 1:
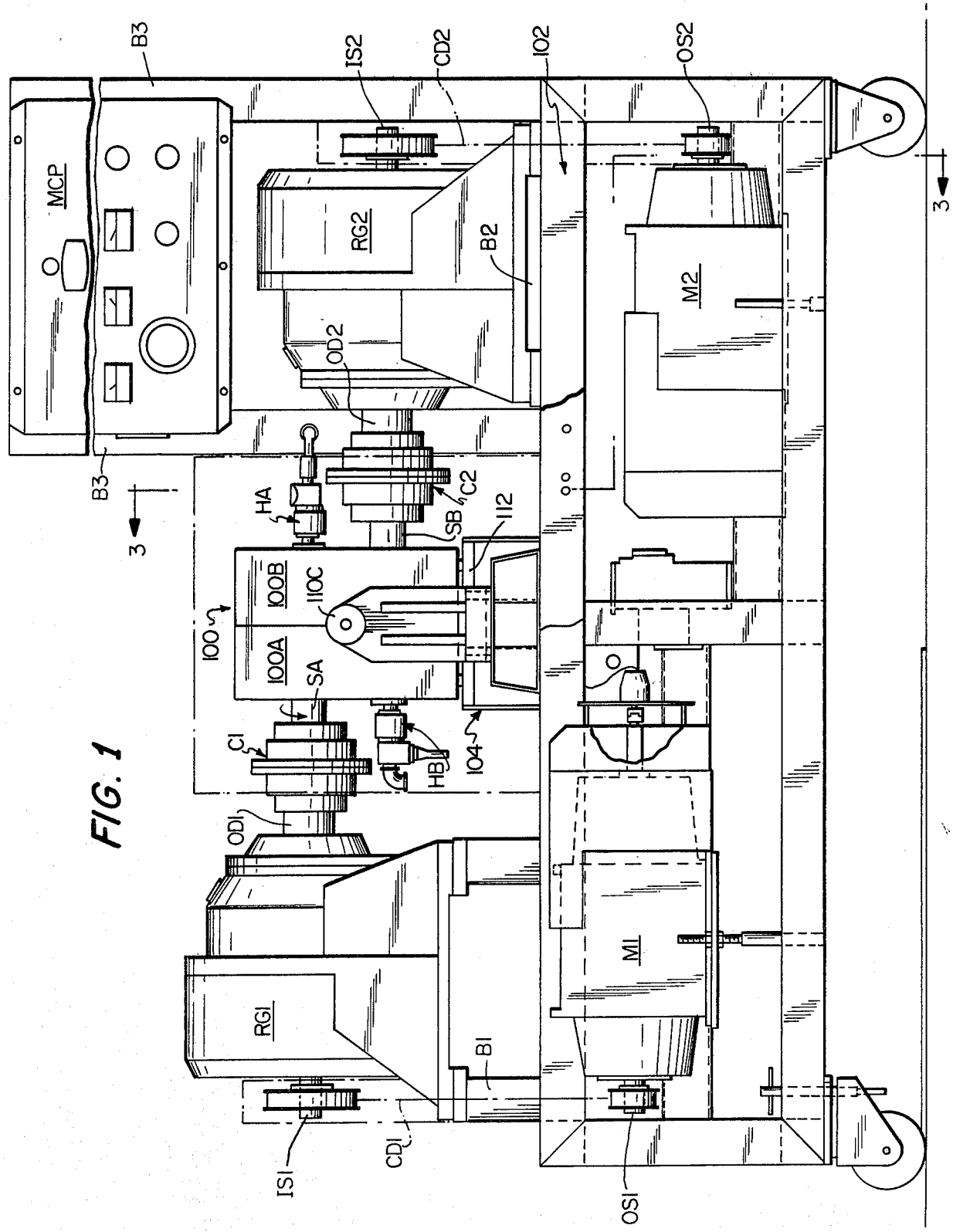
FIG. 1 is a front elevation of an assembled dynamic cooler apparatus of the present invention.
Figure 2:
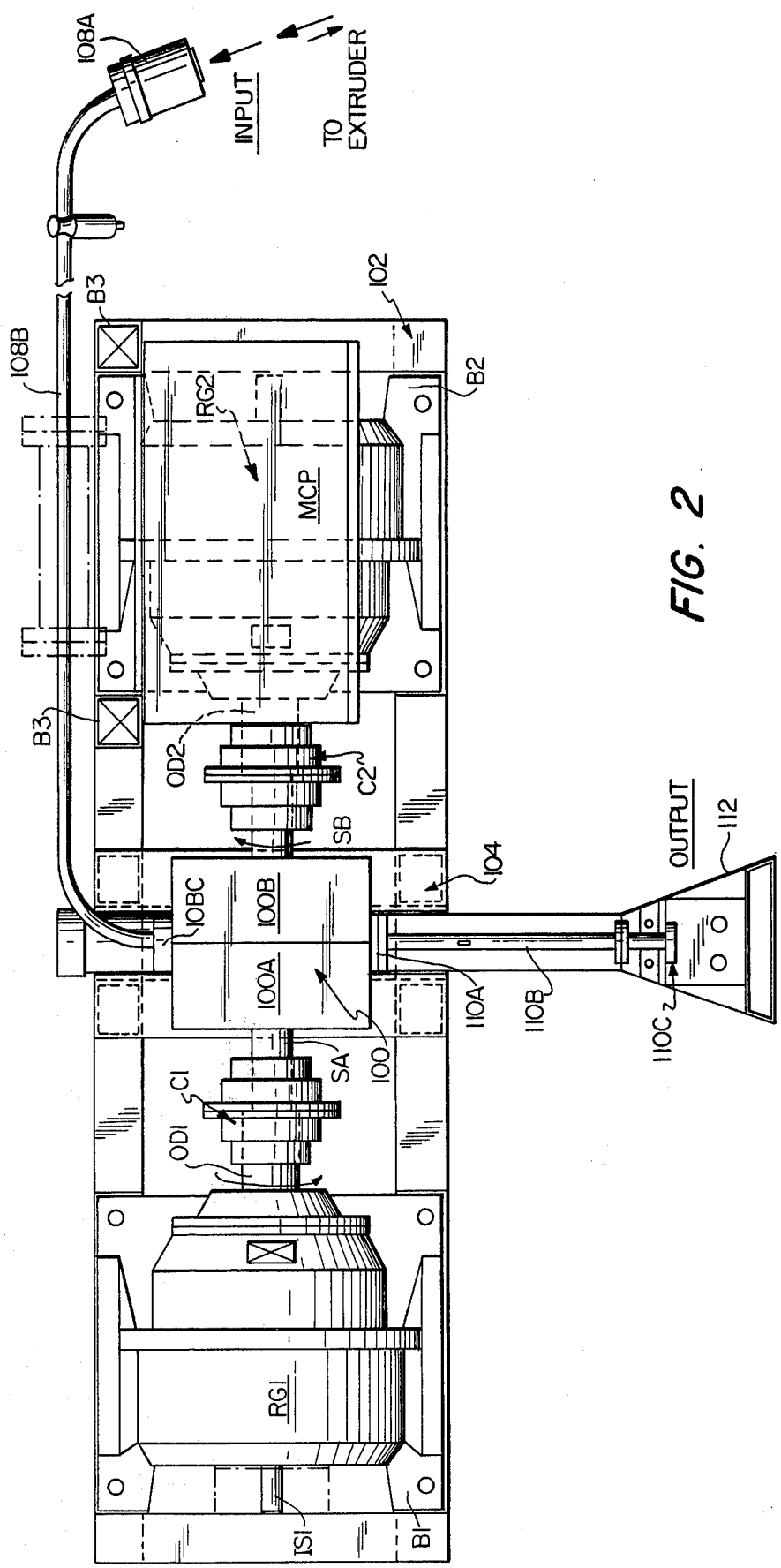
FIG. 2 is a top view of the assembled dynamic cooler apparatus of FIG. 1.
Figure 3:
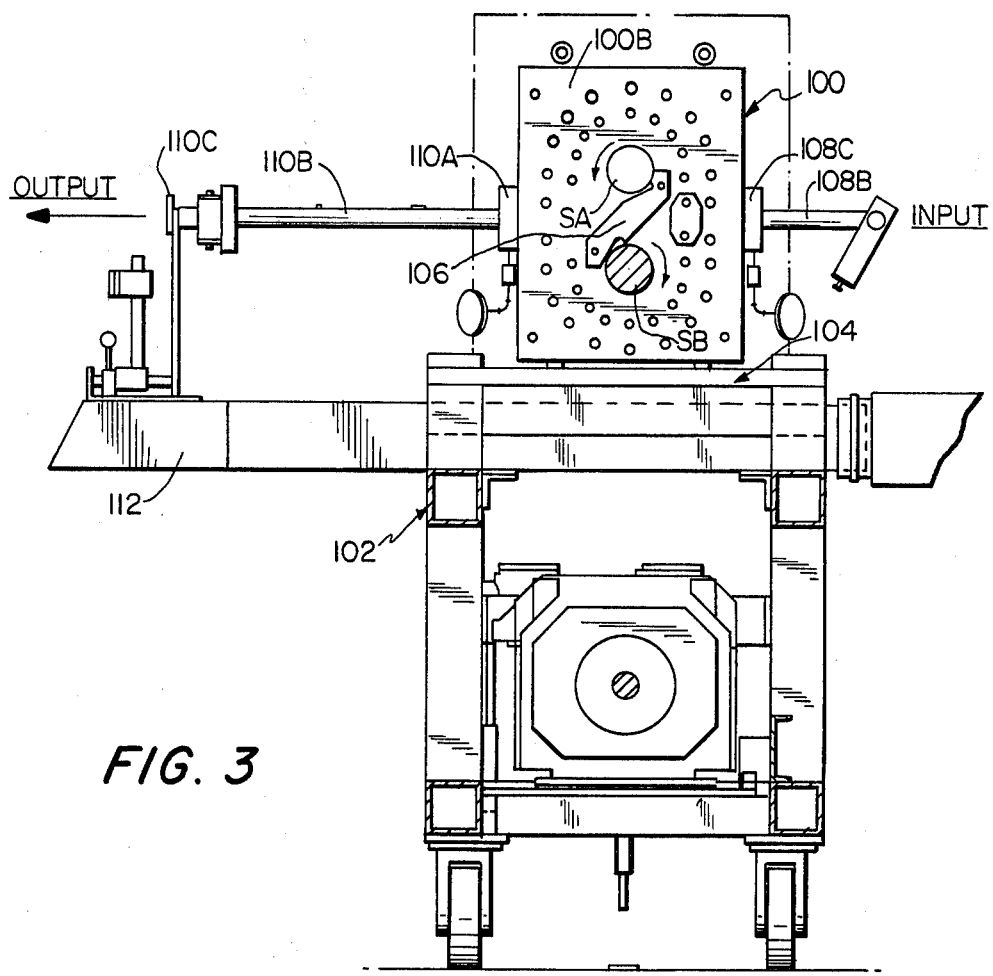
FIG. 3 is a side view of the dynamic cooler apparatus of the present invention in partial cross-section taken along line 3—3 of FIG. 1.
Figure 8:
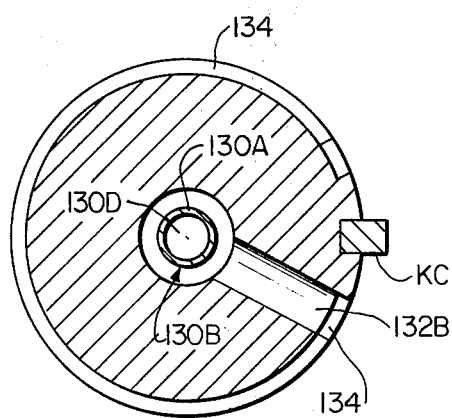
FIG. 8 is a cross-section taken along line 8—8 of FIG. 7 illustrating communication with the internal bore of the metering gear support shaft with the external cooling channels thereon.
Figure 9:
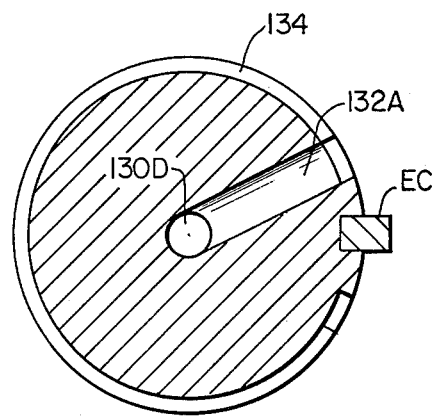
FIG. 9 is a second cross-section taken along line 9—9 of FIG. 7 and axially displaced from the cross-section of FIG. 8 illustrating another communication of the internal bore of the shaft with the external cooling channels thereon.

Referring in detail to the drawings and with particular reference to FIGS. 1, 2 and 3, a dynamic cooler 100 is shown as being mounted on a machinery stand 102 on a suitable pedestal or base plate assembly 104 such that the dynamic cooler 100 is maintained in a fixed position with respect to the remainder of the machinery frame 102.

In the lower level of the machinery frame 102 at basically opposite ends thereof are mounted first and second electric motors M1 and M2 shown on the left-hand end and right-hand end, respectively, in the side elevation of FIG. 1.

The motors have output shafts OS1 and OS2 adjacent the outermost ends of the machine stand 102 which drive, through a chain drive CD1 and CD2, respectively, the input shafts IS1 and IS2 of reduction gearing assemblies RG1 and RG2, mounted on the machine stand 102 above the respective electric motors M1 and M2. Suitable pedestals or brackets B1 and B2 are provided, respectively, for the reduction gearing assemblies RG1 and RG2 to place them at the proper elevation above the machine stand 102 for the purpose of directly coupling their respective output drive shafts OD1 and OD2 to the dynamic cooler 100 as will be hereinafter more fully described.

A motor control panel MCP for controlling the energization and speeds of the respective electric drive motors M1 and M2 is mounted above the second reduction gearing assembly RG2, as illustrated on the right-hand side of FIGS. 1 and 2, and includes a console of control circuitry and the like. Elongated vertical supports B3 maintain the motor control panel MCP and its console structure above the said second reduction gearing assembly RG2 on the machine stand 102.

The dynamic cooler assembly 100 includes a relatively massive split housing assembly which is provided in two halves 100A and 100B which will be hereinafter more fully described in regard to FIGS. 4, 5 and 9–15.

The first housing half 100A has a first cooler input shaft SA extending therefrom and being coaxially interconnected and driven by the output shaft OD1 from the first reduction gear assembly RG1 by a coupler C1.

As illustrated in FIGS. 1, 2 and 3, the input shaft SA extending from the first housing half 100A of the cooler 100 is elevated from an oppositely extending input shaft SB, the latter extending outward from the second housing half 100B of the cooler 100 coaxially of and connected in driven relationship with the output shaft OD2 of the second reduction gearing assembly RG2 by means of a second shaft coupler C2.

Both of the drive shafts SA and SB of the dynamic cooler assembly 100 extend completely through the two housing halves 100A and 100B such that appropriate heat exchange fluid connections HA and HB, respectively, can be made at the non-driven ends of these shafts.

As further illustrated in FIG. 3, a lubricant doctor blade or scraper assembly 106 is provided on each of the housing halves 100A and 100B in contact with the external portions of the shafts SA and SB immediately adjacent the outer surface of the respective housing halves 100A and 100B for a purpose to be hereinafter more fully described in detail.

Input and output positions are labeled in FIGS. 2 and 3 for the dynamic cooler assembly 100 with the input comprising a fluid coupling 108A which is for the purpose of receiving molten extrudate from an upstream extruder as indicated in FIG. 2 and which by means of a pipe or conduit 108B feeds molten extrudate into an input port 108C in the junction between the housing halves 100A and 100B at an elevation above the machine frame 102 which is intermediate the respective elevations of the drive shafts SA and SB.

A coaxial output port 110A is provided in the opposite side of the junction between the two housing portions 100A and 100B which through a pipe or fluid line 110B supplies an output nozzle 110C mounted on an outboard bracket 112 of the machinery stand 102.

Any suitable nozzle configuration may be incorporated in the output nozzle 110C and, of course, suitable downstream web or other die expressed media handling devices may be placed downstream from the die 110C commencing at the outboard bracket 112.

Figure 5:
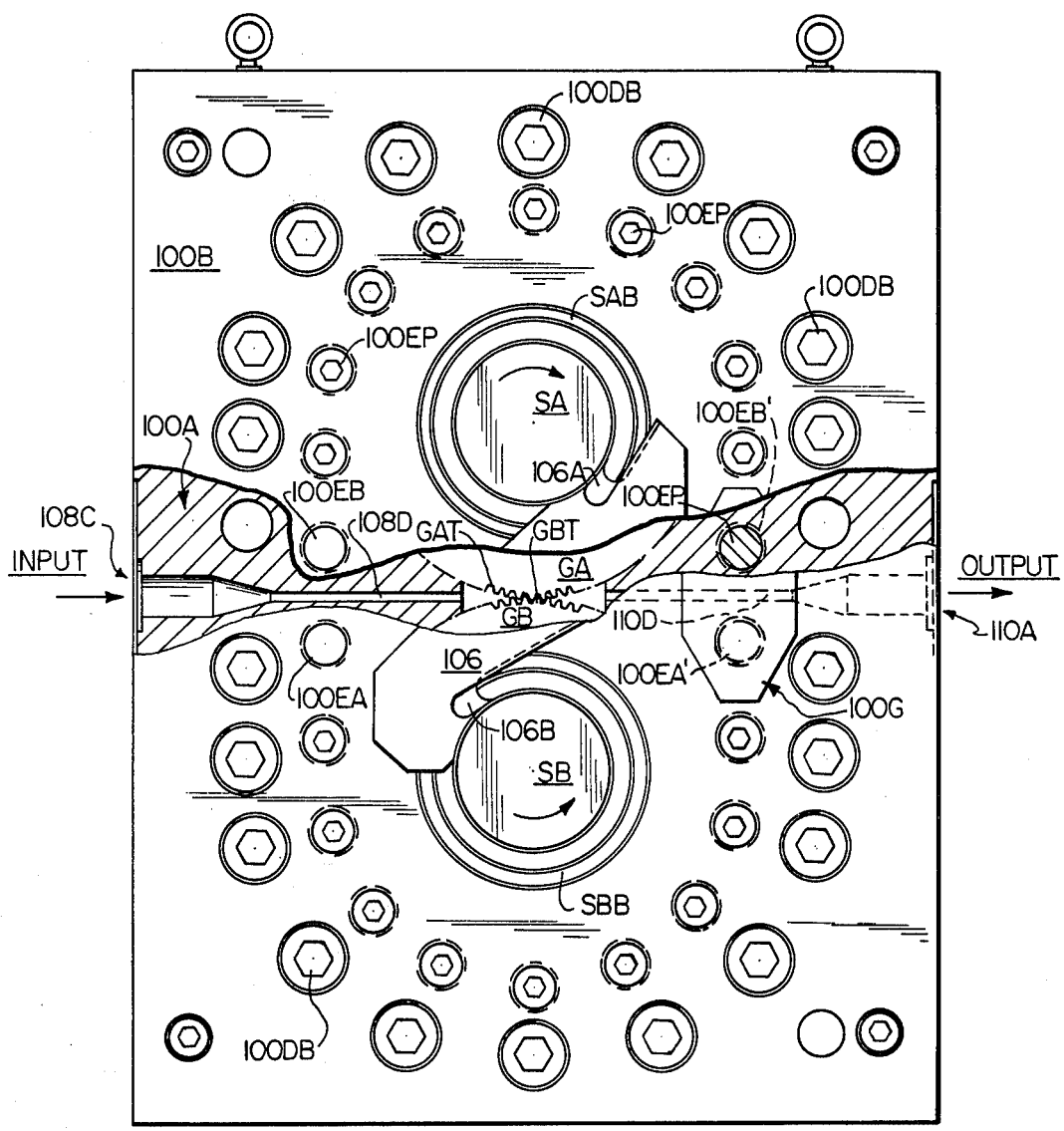
FIG. 5 is an enlarged detail of the housing of the dynamic cooler apparatus shown in FIG. 3 in partial cross-section to illustrate the intermeshing of the gear pump teeth and to show the general configuration of the interior portions of the inlet and outlet ports.
Figure 15:
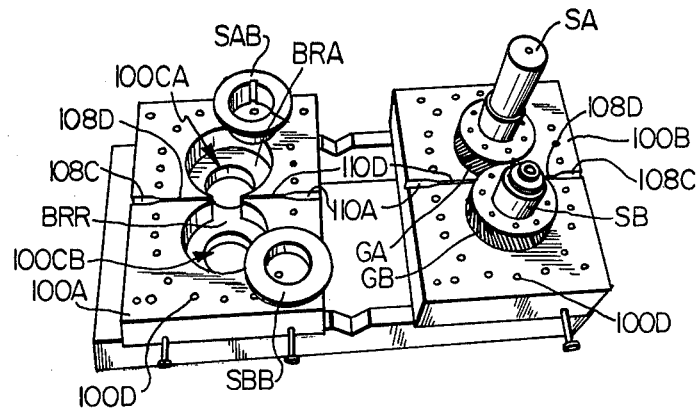
FIG. 15 is a partially assembled view of the housing and metering gear portions of the dynamic cooler apparatus of the present invention with the housing halves split apart, the two metering gears in place within the metering chamber and the sleeve bearings for mounting the metering gears and their respective drive shafts in the metering chamber being lifted out of the metering chamber to illustrate their configuration as compared to the internal seating configuration therefor within the metering configuration.

Referring jointly to FIGS. 4, 5 and 15, the respective housing halves 100A and 100B are shown as including a figure eight shaped internal cavity comprised of an upper portion 100CA and a lower portion 100CD for respectively receiving the shafts SA and SB, the said shafts having bi-helical pump gear assemblies GA and GB mounted thereon within the respective cavity halves 100CA and 100CB.

The housing halves 100A and 100B are bolted together by means of bolt ports 100D drilled therethrough a respective registry for receiving bolts 100DB therein in a complete pattern around the said housing halves as illustrated with regard to the housing half 100B in FIG. 5.

The intermeshing of the gear teeth GAT and GBT on the respective pump gear assemblies GA and GB are illustrated in side elevation in FIG. 5 and in front elevation viewed from the inlet side of the dynamic cooler 100 in FIG. 4.

The dynamic cooler drive shafts SA and SB are shown as mounted in cup-shaped bushing assemblies SAB for the shaft SA and SBB for the shaft SB. These bushing assemblies are so designed as to permit molten material to leak in a controlled manner between themselves and bearing surfaces on the shafts SA and SB for the purpose of providing lubrication as will be hereinafter more fully described.

Also illustrated in FIGS. 4 and 5 are a plurality of plug receiving ports 100E which, as illustrated in FIG. 5, include a plurality of plugs 100EP for the purpose of providing return paths in a fascile manner of manufacturing for fluid flow passages 100F which are shown only as a minor portion of the terminal outboard ends thereof in FIG. 4. These flow passages will be more fully described with reference to FIGS. 10–14.

The doctor or lubricant scraping blade 106 is also illustrated in enlarged detail in FIG. 5 and is shown as having respective knife edges 106A and 106B engaging the pumping shafts SA and SB and the outermost portions of the bearing assemblies SAB and SBB.

The input and output ports 108C and 110A, respectively, are illustrated in FIGS. 5 and 15 as being connected to the junction between the upper and lower internal cavity portions 100CA and 100CB through diametrically opposed fluid passages 108D and 110D, respectively. These passages feed molten plastic material into and out of the internal cavity 100CA–100CD of the dynamic cooler 100 by means of the pumping action of the pumping gear assemblies GA and GB as will be hereinafter more fully described.

Referring additionally to FIGS. 6, 7, 8 and 9, further details of a typical pumping gear assembly will now be described with the pumping gear assembly GA from FIGS. 4 and 5. The description of the assembly GA is also appropriate for the pumping gear assembly GB which is identical to the assembly GA.

The pumping gear assembly GA is shown as keyed to the shaft SA by means of shaft keys KA which cooperate beneath the extended coaxial portions of shaft bushings BA (similar bushings BB generally indicated in FIGS. 4 and 5 being mounted on the pump gear assembly GB). These shaft bushings are conformally shaped and so dimensioned with respect to the cup-shaped bushings SAB (the bushings BB cooperating with the cup-shaped bearings SBB in the same manner) to permit leakage of high pressure molten thermoplastic material therebetween to thereby lubricate the bearing means by which the shaft SA and gear pump assembly GA as well as the shaft SB and gear pump assembly GB are mounted for rotation in the housing sections 100A and 100B of the dynamic cooler 100.

A drive key KB is illustrated on the driven input end of the shaft SA for the purpose of joining that shaft to a section of the coupler C1 illustrated in previously described figures.

The shaft bushings BA also act to maintain the gear assembly GA on the shaft SA by means of an internal key KC which is best shown in FIGS. 6 and 7.

The diameters of the gear assemblies GA and GB are sufficiently smaller than the internal diameters of the upper and lower cavities 100CA and 100CB, respectively, to provide sufficient clearance over the outside diameter of the gear assemblies GA and GB to preclude direct contact between them and the internal periphery of the cavities 100CA and 100CB. This clearance assures minimum wear of both said assemblies and said housing cavities.

The gear assembly GA is rendered bi-helical by preferably forming it in one piece or, alternatively, from two half sections GA1 and GA2, the latter being illustrated in FIG. 6. These sections are held together by through bolts 120 which are mounted in aligned cupping ports 122 in the respective gear halves GA1 and GA2. The through bolts 120 also retain one of the shaft bushings BA on the section GA1 and additional bolts 120A in retaining bores 122A are provided to retain the shaft bushing BA on the other gear section GA2.

Suitable O-ring seals 124 are provided between the gear halves GA1 and GA2 inboard and outboard respectively of the radial position of the various through bolts 120.

Additionally, O-ring seals 126 are provided between the base flanges of the shaft bushings BA and their engagement with the gear halves GA1 and GA2. In this regard, the flange portions of the shaft bushings BA are housed in the end faces of the gear sections GA1 and GA2 in conformally shaped annular troughs or channels 128.

Internal cooling of the bi-helical assembly GA is provided by means of a centrally located fluid inlet port structure 130 within the shaft SA which inlet port structure 130 has a relatively reduced diameter flow tube 130A extending concentrically through a relatively enlarged diameter bore 130B into engagement with an internal socket 130C at the input end of a reduced diameter inner bore 130D. The inner bore 130D is a coaxial reduced diameter extension of the enlarged diameter bore 130B. The innermost end of the inner bore 130D is connected by means of a first radial flow port 132A with one of a serpentine surface configuration 134 which extends approximately 310° around the periphery of the shaft SA within the two gear halves GA1 and GA2, and which further has, at its outermost end in communication with the inner end of the enlarged diameter bore 130B, a second radially disposed flow port 132B positioned at a rotation of 310° from the first radial port 132A at the opposite (inner) end of the serpentine path 134 on the surface of the shaft SA. The entire serpentine path or pattern 134 is contained internally of the gear halves GA1 and GA2 between the two shaft bushings BA as clearly shown in FIG. 4.

A substantially identical configuration of tubes, bores and serpentine patterns is provided internally of the end of the shaft SB at its point of emergence from the housing half 100A adjacent the heat exchange coupling HD. Accordingly, both the bi-helical assemblies GA and GB are internally cooled by circulation of fluid which enters through the tube 130A, proceeds through the inner bore 130D and first radial port 132A into the serpentine configuration on the surface of the shaft SA and then circulates through the serpentine configuration to the point where it exits through the second radial port 132B back into the enlarged diameter bore 130B of the inlet configuration 130 and then outward into the heat exchange coupler HA. The same flow path configuration exists within the second gear assembly GB in cooperation with the heat exchange coupler HB. This configuration also applies for the preferred one piece gear assemblies.

Figure 16:
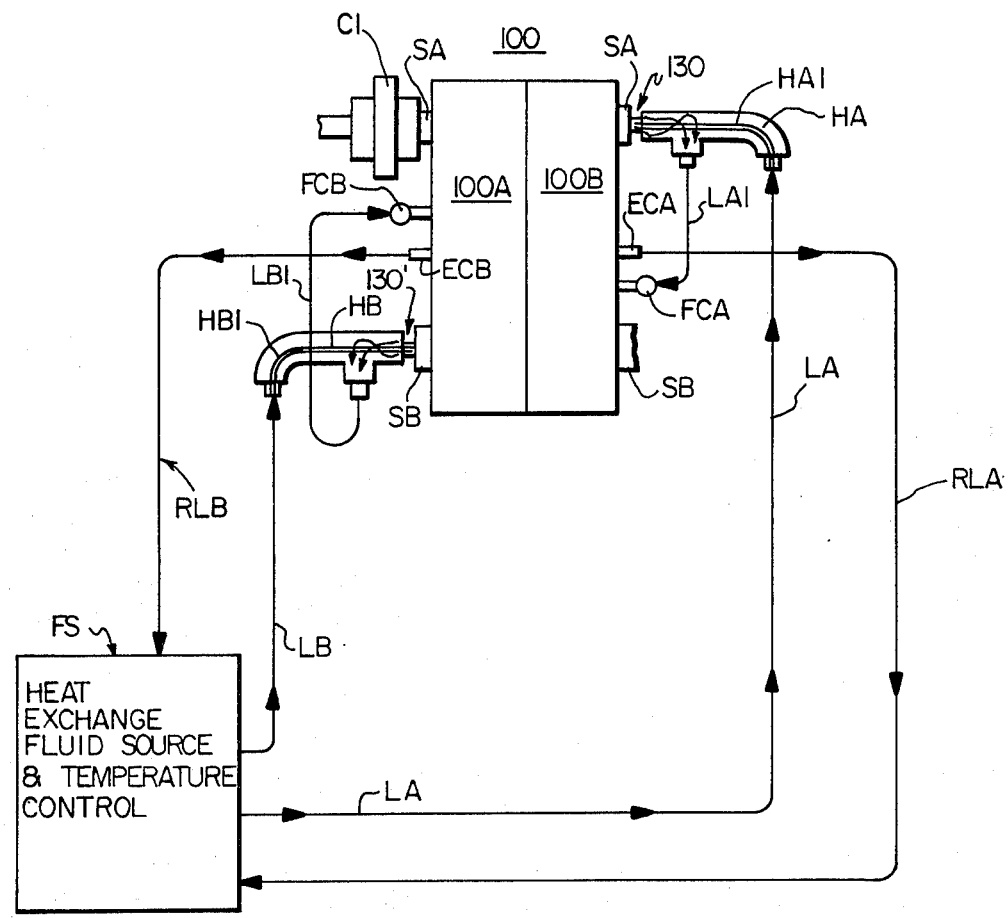
FIG. 16 is a schematic of the heat exchange fluid flow circuit in the present invention.

With further reference to FIG. 16, the overall heat exchange fluid system is schematically illustrated as including a heat exchange fluid source and temperature control device FS which includes suitable conventional equipment for providing a variable flow of heat exchange fluid to and from the dynamic cooler 100 by means of first and second supply lines LA and LB supplying heat exchange fluid at a given flow rate and temperature to the heat exchange fluid couplings HA and HB, respectively.

The heat exchange fluid coupling HA which is connected with the inlet port structure 130 on the shaft SA is shown as including an interior inlet tube HA1 which corresponds to the reduced diameter inlet tube 130A of FIG. 7 and, as indicated in FIG. 7, fluid comes in from the internal line HA1 to the inlet tube 130A.

Also, associated with the heat exchange fluid coupling HB on the shaft SB is a substantially identical fluid coupling 130' which cooperates with an internal inlet tube HB1 in the said heat exchange fluid inlet coupling HB.

Accordingly, fluid enters the inlet couplings HA and HB through the lines HA1 and HB1 into the inlet couplings 130 and 130' in the respective cooler shafts SA and SB and after proceeding through the serpentine configurations 134 disclosed in and described in FIG. 7, exits the couplings HA and HB through lines LA1 and LB1 respectively, into fluid inlet connectors FCA and FCB, respectively. Each of these fluid inlet connectors FCA and FCB provide the source of heat exchange fluid for a serpentine heat exchange flow path through a respectively associated side 100B and 100A of the dynamic cooler 100 as will be hereinafter more fully described in regard to FIGS. 10-15.

Exits from the respective internal serpentine fluid flow paths in each of the dynamic cooler halves 100A and 100B are provided by exhaust connection ECB and ECA, respectively. These exhaust connections ECA and ECB feed exhaust fluid return lines RLA and RLB which return the heat exchange fluid from the dynamic cooler 100 back to the heat exchange fluid source and temperature control module FS.

With the basic cooling control system having been described in regard to FIGS. 6-9 and 16, the internal detail of the housing 100 including the serpentine coolant paths within the diameter cooler halves 100A and 100B will now be described with reference to FIGS. 10-15.

A serpentine pattern of flow passages 100F is clearly illustrated in the partial cross-section of the housing segment 100D in FIG. 13 of the drawings, with the plug holes 100E being illustrated in full cross-section with the intersecting flow passages 100F forming a pair of serpentine coolant paths fully contained within the mass of the housing half 100B with ports 100EA and 100EB comprising the inlet and outlet ports connected, respectively, to lines LA1 and return lines RLA. The input line LA1 is connected to the source of heat exchange fluid entering the dynamic cooler through the rotary coupler HA as previously described in regard to FIG. 16. The return line RLA extends from the output coupling ECA, which is placed in the output port 100EB to the return portion of the heat exchange fluid source and temperature control console FS.

The two serpentine coolant section halves are made into one continuous flow path by an external flow coupler 100G which overlies the counterparts 100EB' and 100EA' on the opposite side of the housing section 100B from the inlet and output ports 100EA and 100EB. This flow coupler 100G is also illustrated in FIG. 5.

Figure 12:
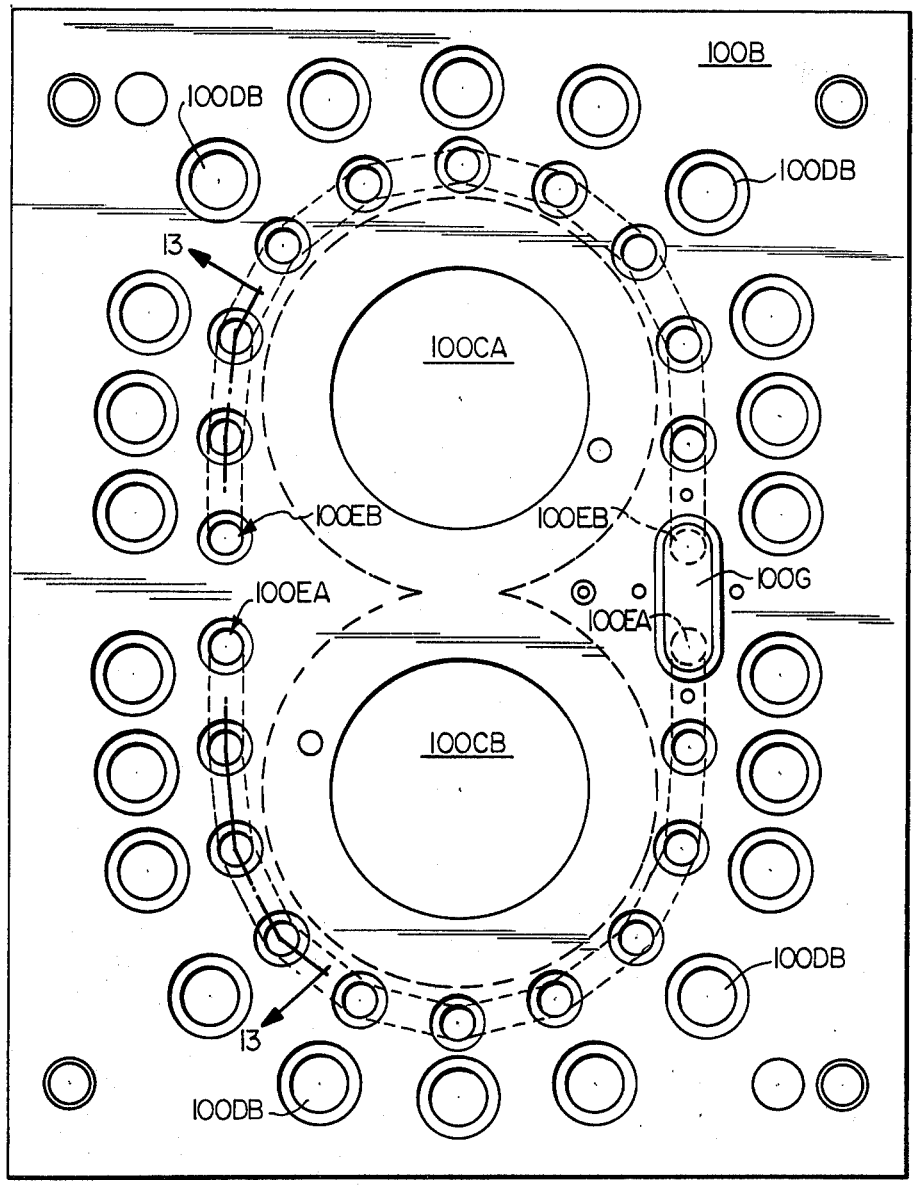
FIG. 12 is the external plan view of the housing half of FIG. 10.

As also illustrated in FIGS. 5 and 12, the ports 100E are all plugged by plugs 100EP and arranged in a basically oval pattern externally of the outermost dimensions of the figure eight shaped cavity defined by the upper and lower cavity halves 100CA and 100CB, respectively.

This oval configuration of ports 100E bearing plugs 100EP is also illustrated in FIGS. 5 and 12 together with the oval configuration of through bolts 100DB which maintain the housing halves 100A and 100B in a substantially integral configuration of great strength and substantial heat exchange mass.

Figure 10:
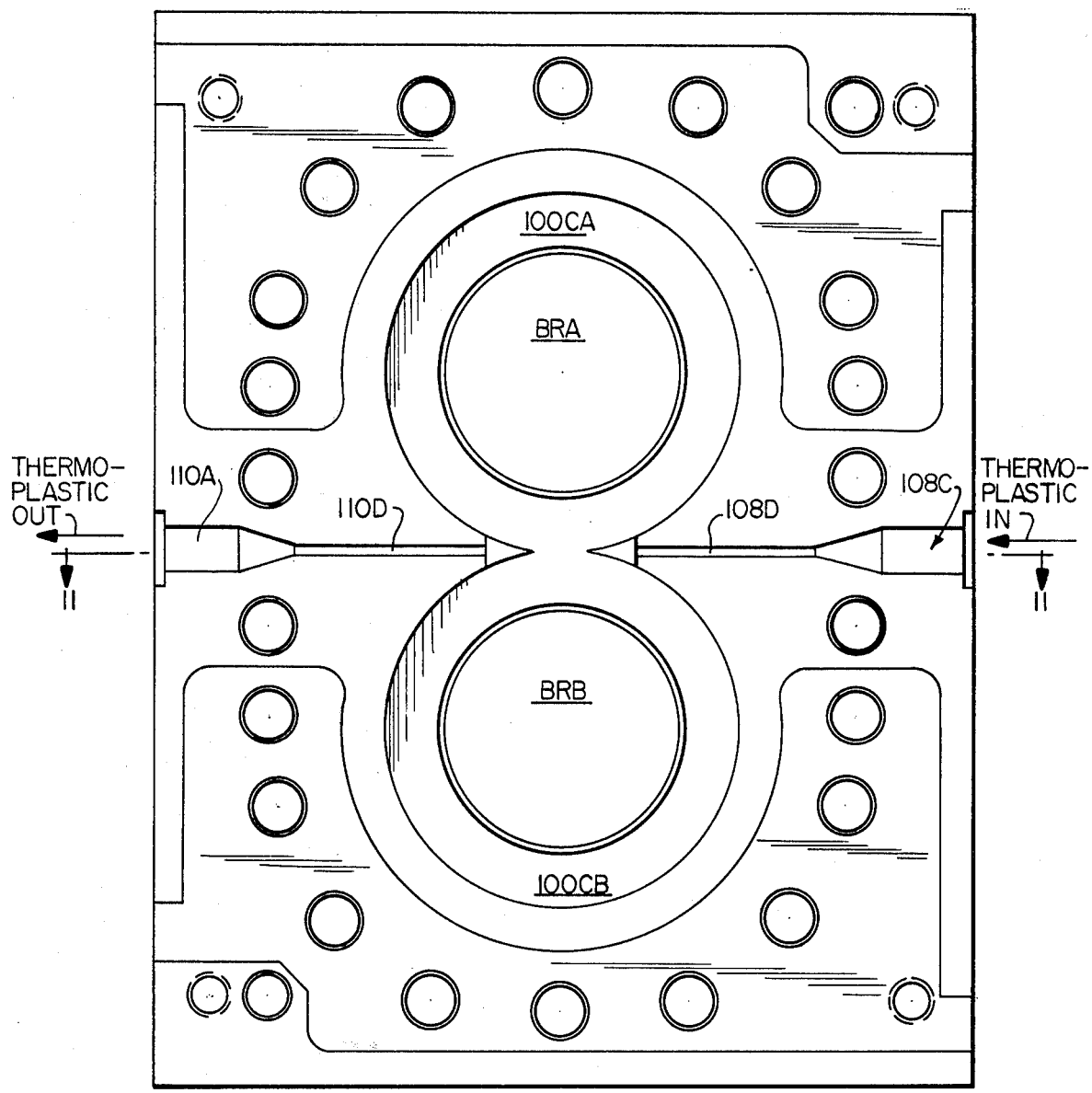
FIG. 10 is an internal plan view of one-half of the housing of the dynamic cooler assembly of the present invention including one-half of the figure eight shaped internal chamber for receiving the metering gears therein.
Figure 11:
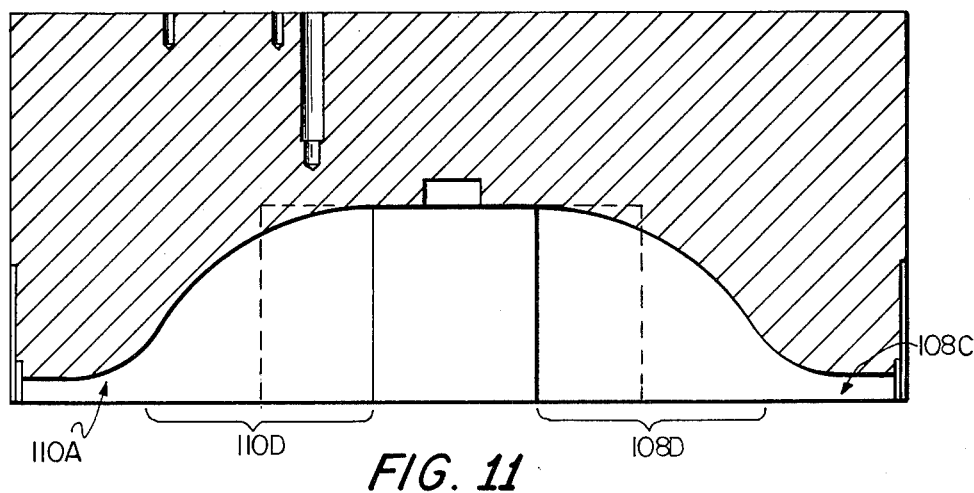
FIG. 11 is a cross-section taken along line 11—11 of FIG. 10.

As illustrated in FIGS. 10, 11 and 14, the inlet port 108C for the thermoplastic material and its associated low vertical height but relatively wide internal feed port 108D and the thermoplastic exit port 110A and its relatively short vertical height but wide horizontally dimensioned port 110D are streamlined or fan shaped in cross-section such that thermoplastic ingested into the gear pump cavities 100CA and 100CB is ingested in an elongated rectangular port completely coterminate with the pumping gear halves GA and GB and that thermoplastic material exiting through the streamlined rectangular port 110D exits in the same manner and is then forced under pressure to leave the constricted end of the slot 110D at the relatively smaller outlet port 110A whereby the increase in pumping pressure becomes evident to the balance of the system, namely, a downstream extrusion die. This increase in pressure, however, is isolated from the upstream end of the system which only sees the input pressure or condition at the inlet port 108C since the pumping gears GA and GB are drawing material into the pumping cavities 100CA and 100CB through the streamlined delivery port 108D.

Also, as illustrated in FIGS. 10, 14 and 15, the housing section 100B as well as 100A which is illustrated in an open condition in FIG. 15, includes counterbored bearing recesses BRA and BRB in the outermost portions of the upper and lower pumping cavities 100CA and 100CB, respectively, in each of the halves 100A and 100B of the housing of the dynamic cooler 100.

It is to be understood that as in the case of the gear sections GA and GB, the housing sections 100A and 100B are substantially identical unless otherwise specifically specified. Accordingly, there is a serpentine cooling path of intersecting flow passages 100F together with the plugs 100E and flow guide 100G and the inlet and outlet ports 100EA and 100EB, etc., in the housing half 100A in the identical relationship to that already described for the housing half 100B in connection with FIGS. 10–14.

With the mechanical structure and interrelationship of the various elements of the dynamic cooler 100 of the present invention now having been described, the motor control circuit for the DC motors M1 and M2 will now be described with reference to FIG. 17 in which that motor control circuit is schematically shown.

The motor M1 is illustrated as driving a tachometer generator TG at the same speed as its output shaft OS1 and the output of the tachometer generator TG is transmitted through a speed signal line PS to an input of a load balance and speed control network N.

The load balance and speed control network N is connected to a source of electrical power EP through a main power line PM and transfers driving power to motors M1 and M2 through respective power leads P1 and P2 connected to outputs of the load balance and speed control circuit N.

The motors are interconnected by means of an armature feedback configuration or other conventional load balancing and speed control circuitry which is schematically illustrated by two-way leads PC1 and PC2 connected to the respective motors M1 and M2 and to inputs on the load balance and speed control network N.

Accordingly, the load balance and speed control network N provides any conventional means for selectively setting the speed of the motors M1 and M2 and acts to automatically distribute the load between the motors by controlling the torque which each provides to its respectively associated gear shaft SA and SB, whereby the gear halves GA and GB are driven in substantially the same balanced manner so that loading of the gear teeth thereon will be substantially precluded.

OPERATION OF THE DYNAMIC COOLER OF THE PRESENT INVENTION

Referring to FIGS. 1–5, 16 and 17, a typical operation of the dynamic cooler 100 of the present invention is commenced by transmitting fluid from the heat exchange fluid source and temperature control FS at an operating temperature of, for example, 450° F., through the lines LA and LB through the rotary couplings HA and HB and back through return lines RLA and RLB such that the entire body of the housing comprising the halves 100A and 100B, the gear sections GA and GB and all other portions of the dynamic cooler 100 which are to engage molten thermoplastic are heated to the uniform temperature on the order of 450° F.

The motors M1 and M2 are then energized through the motor control network N with the speed of the motors being set by that network to whatever output rate is chosen based upon the pumping efficiency of the pumping gears GA and GB.

As molten thermoplastic is ingested (FIG. 2) into the inlet 108A from a suitable extruder upstream from the cooler 100, the speed of the cooler 100 is adjusted by the network N to whatever output rate is compatible for the extrusion die 110C or the like downstream from the outlet 110A and connected thereto by the outlet conduit 110B. This provides a desired pressure profile throughout the extruding system in which the dynamic cooler is incorporated, after which the heat exchange fluid source and temperature control FS is adjusted to commence the heat exchange fluid flowing through the serpentine oriented ports 100F throughout the housing halves 100A and 100B and surrounding the figure eight shaped cavity comprised of the upper cavity portion 100CA and lower cavity portion 100CB. This flow of heat exchange fluid will cool the gears GA and GB and the housing 100A and 100B to whatever temperature is required to bring the stock temperature of the molten thermoplastic material leaving the cooler 100 to a suitable level for good foam formation at the die 110C. By way of typical example, a desirable temperature level for polystyrene foam is approximately 290° F. To reach this temperature level, the housing and gears might actually be cooled to as low as 100° F.

During the pumping operation of the cooler 100, the thermoplastic material under pressure surrounding the gear sections GA and GB and filling the cavities 100CA and 100CB is permitted to leak between the housing bushings SAB and SBB and the respective shaft bearings BA and BB to provide a lubricating film therebetween of molten thermoplastic material.

In the lubrication of the bearings and housing bushings with molten thermoplastic material, it is important to maintain the housing bushings and bearings at a relatively elevated temperature in order to preclude unduly high torque due to the sharp increase in viscosity of the molten thermoplastic material if the overall housing and gear sections have been cooled to lower temperatures than is permissible to achieve the desired torque loading in the bearings.

To achieve this result, it can be noted that in the cross-section of the housing bushings SAB in FIG. 4, annular troughs AT provided in the outer surface of the cylindrical sleeve portion of the housing bushings SAB and suitable electric resistance heaters R or other means which will thermally isolate both the housing bushings and their associated bearings from the temperature conditions in the remainder of the dynamic cooler assembly 100 are provided to maintain the temperature of the housing bushings SAB and SBB together with the respectively associated shaft bearings BA and BB at a sufficiently elevated temperature such that the molten thermoplastic material leaking therebetween for the purpose of lubricating these bearings will be maintained at a sufficiently elevated temperature to preclude undue viscosity and torque loading for the bearings.

The electric resistance heaters R are energized from any suitable source means such as a source of electric power located within the dynamic cooler control panel MCP illustrated in FIG. 1.

Figure 17:
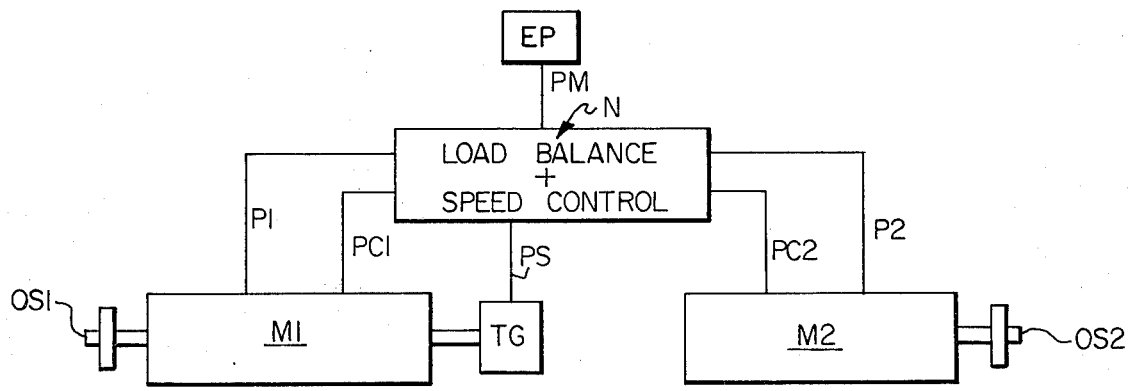
FIG. 17 is a schematic of the drive motor speed control circuit of the present invention.

Also, the network N for controlling the motor speed and loading as described in connection with FIG. 17 is positioned within the motor control panel MCP of FIG. 1.

The diameters of the pumping gears GA and GB have been selected to be substantially identical in order that the heat exchange taking place between the gears and the molten thermoplastic material will provide a uniform temperature for the molten thermoplastic material at the intersection between the two pumping gears GA and GB on the downstream side thereof just prior to entry of the exiting thermoplastic material into the fan-shaped flow port 100D on its way to the outlet port 110A. If the gear sections GA and GB were of different diameters, then the circumferential path followed by the molten thermoplastic material in a heat exchange relationship with the gears GA and GB and the internal walls of the housing cavities 100CA and 100CB would be different lengths and therefore, the cooling effected on the thermoplastic material would be non-uniform.

By utilizing gear teeth which are relatively small, this factor being made possible by the independent drive mechanism effectuated by controlling the motors M1 and M2 through the load balancing network N, the cross-section of molten thermoplastic material present in the troughs between the gear teeth GTA and GTB is optimally minimized such that efficient heat exchange can be effectuated and the temperature of the molten thermoplastic material readily controlled.

The bi-helical configuration of the gear sections GA and GB is so arranged that the V apex of the bi-helical teeth GAT GBT on each of the said gear sections is a leading apex which encourages lateral flow and scavenging of the molten thermoplastic material contained between the teeth. This not only causes an efficient outflow of thermoplastic at the downstream side of the pumping gears GA and GB but also lends to the forcing of the molten thermoplastic material between the housing bushings SAB and SBB and the respectively associated shaft bearings BA and BB to properly provide lubricant for the bearings of the main gear shafts SA and SB.

It is to be understood that the heat exchange fluid source and temperature control can be replaced by electric heating controls and electric heating devices can be inserted in a serpentine manner through the various housing halves to provide the heating cycle at the start up of the dynamic cooler. Water cooling can then be utilized rather than oil cooling if desired. However, as previously described, heating and cooling through the use of heat exchange fluid such as oil can also be effectuated in the embodiment shown.

As can be readily seen from the foregoing specification and drawings, the present invention has provided an effective and efficient means for extracting heat from molten thermoplastic material upstream from an extrusion die or the like in combination with a positive displacement transfer mechanism which operates with minimum shear and power consumption and which isolates the extruder portion of the extrusion line from the die portion of that line so that ripple effects caused by heat changes and pumping pressures within the extruder can be isolated from the extruding die to preclude internal stresses and variations in the extruder from affecting the quality of the extruded foam or other product at the extrusion die.

It should be understood that the DYNAMIC COOLER APPARATUS FOR MOLTEN THERMOPLASTIC MATERIAL of the present invention may be modified as would occur to one of ordinary skill in the art without departing from the spirit and scope of the present invention.

It is claimed:

1. Means dynamically cooling and pumping molten thermoplastic material from an input source to an output device while isolating said input source from said output device, comprising:
   a housing of a substantial mass of heat conducting material;
   a pumping cavity defined within said housing and having inlet and outlet ports communicating therewith from opposite sides thereof;
   first and second intermeshing pumping gears having a line of intersection mutually adjacent said inlet and outlet ports, each of said pumping gears having a plurality of teeth with troughs defined between adjacent said teeth;
   first and second rotary pump shafts extending through said housing and said pumping cavity and respectively mounting said first and second pumping gears for rotation therewith;
   heat exchange fluid circulating means extending internally of said pumping gears and through said housing in a flow configuration substantially encompassing said pumping cavity; and
   first and second motor means driving said first and second pump shafts, respectively, independently of one another and in a load sharing manner to substantially preclude loading between said intermeshing pumping gears;

said teeth having a cross-section which optimally minimizes the cross-sectional area of molten thermoplastic material in said troughs to maximize exposed surface area and cooling efficiency.

2. The invention of claim 1, wherein said first and second pumping gears comprise bi-helical gears.

3. The invention of claim 2, wherein said bi-helical gears each include bi-helical gear tooth configurations thereon having the apices of said bi-helical tooth configurations leading the direction of rotation of said pumping gears.

4. The invention of claim 1, which further includes a source of heat exchange fluid for delivering said fluid to said heat exchange fluid circulating means and receiving returned fluid therefrom;
   coaxial flow passage means in each of said pump shafts communicating with the interior of respective ones of said pumping gears; and
   coupling means interconnecting said source with each said coaxial flow passage means to admit and receive fluid thereto and therefrom.

5. The invention of claim 4, wherein said fluid circulating means further includes input and output connector means on said housing for admitting and exhausting heat exchange fluid to and from said flow configuration encompassing said pumping cavity;
   said output connector means being connected to said source to return fluid thereto; and
   said coupling means being connected with said input connector means to transmit fluid received from said coaxial flow passage means to said flow configuration.

6. The invention of claim 4, wherein said first and second pumping gears comprise bi-helical gears.

7. The invention of claim 6, wherein said bi-helical gears each include bi-helical gear tooth configurations thereon having the apices of said bi-helical tooth configurations leading the direction of rotation of said pumping gears.

8. The invention of claim 6, wherein said fluid circulating means further includes input and output connector means on said housing for admitting exhausting heat exchange fluid to and from said flow configuration encompassing said pumping cavity;
   said output connector means being connected to said source to return fluid thereto; and
   said coupling means being connected with said input connector means to transmit fluid received from said coaxial flow passage means to said flow configuration.

9. The invention of claim 8, wherein said bi-helical gears each include bi-helical gear tooth configurations thereon having the apices of said bi-helical tooth configurations leading the direction of rotation of said pumping gears.

10. The invention of claim 1, which further includes first and second sets of bushing means mounted in said housing on opposite sides of said pumping cavity externally concentric, respectively, to opposite ends of said first and second pumping shafts for journalling said shafts in said housing; and
   first and second sets of shaft bearings on said first and second pumping shafts, respectively, conformally shaped with respect to and internally concentric of corresponding ones of said first and second sets of housing bushings for journalling the said respective shafts therein;
   said corresponding bushings and bearings providing therebetween a mutually concentric restricted flow path from said pumping chamber to the exterior of said housing to produce a lubricating flow of molten thermoplastic material therethrough.

11. The invention of claim 10, which further includes thermal means for maintaining said bushings and bearings at a temperature compatible with maintaining said molten thermoplastic material in a lubricating state despite the temperature of said housing and said pumping gears.

12. The invention of claim 10, wherein said first and second pumping gears comprise bi-helical gears.

13. The invention of claim 12, wherein said bi-helical gears each include bi-helical gear tooth configurations thereon having the apices of said bi-helical tooth configurations leading the direction of rotation of said pumping gears.

14. The invention of claim 10, which further includes a source of heat exchange fluid for delivering said fluid to said heat exchange fluid circulating means and receiving returned fluid therefrom;
   coaxial flow passage means in each of said pump shafts communicating with the interior of respective ones of said pumping gears; and
   coupling means interconnecting said source with each said coaxial flow passage means to admit and receive fluid thereto and therefrom.

15. The invention of claim 14, wherein said fluid circulating means further includes input and output connector means on said housing for admitting and exhausting heat exchange fluid to and from said flow configuration encompassing said pumping cavity;
   said output connector means being connected to said source to return fluid thereto; and
   said coupling means being connected with said input connector means to transmit fluid received from said coaxial flow passage means to said flow configuration.

16. The invention of claim 14, wherein said first and second pumping gears comprise bi-helical gears.

17. The invention of claim 16, wherein said bi-helical gears each include bi-helical gear tooth configurations thereon having the apices of said bi-helical tooth configurations leading the direction of rotation of said pumping gears.

18. The invention of claim 16, wherein said fluid circulating means further includes input and output connector means on said housing for admitting and exhausting heat exchange fluid to and from said flow configuration encompassing said pumping cavity;
   said output connector means being connected to said source to return fluid thereto; and
   said coupling means being connected with said input connector means to transmit fluid received from said coaxial flow passage means to said flow configuration.

19. The invention of claim 18, wherein said first and second pumping gears comprise bi-helical gears.

20. The invention of any one of claims 12 through 19, which further includes thermal means for maintaining said bushings and bearings at a temperature compatible with maintaining said molten thermoplastic material in a lubricating state despite the temperature of said housing and said pumping gears.

21. The invention of any one of claims 1 through 19, wherein said housing includes first and second substantially identical mating halves each forming mirror images of the other in mutually defining said pumping cavity; and wherein said heat exchange fluid circulating means includes separate and independent serpentine flow configurations in each of said mating halves, substantially encompassing that portion of said pumping cavity contained in a corresponding one of said mating halves.

22. The invention of any one of claims 1 through 19, wherein said housing includes first and second substantially identical mating halves each forming mirror images of the other in mutually defining said pumping cavity; and wherein said heat exchange fluid circulating means includes separate and independent serpentine flow configurations in each of said mating halves, substantially encompassing that portion of said pumping cavity contained in a corresponding one of said mating halves; and further, wherein said serpentine configurations are respectively connected in a series flow relationship with said circulating means in said pumping gears.

* * * * *